(12) United States Patent
Ogata

(10) Patent No.: US 12,195,946 B2
(45) Date of Patent: Jan. 14, 2025

(54) CONSTRUCTION MACHINE

(71) Applicant: SUMITOMO CONSTRUCTION MACHINERY CO., LTD., Tokyo (JP)

(72) Inventor: Ko Ogata, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 971 days.

(21) Appl. No.: 17/030,805

(22) Filed: Sep. 24, 2020

(65) Prior Publication Data
US 2021/0010233 A1 Jan. 14, 2021

Related U.S. Application Data

(63) Continuation of application No. PCT/JP2019/013442, filed on Mar. 27, 2019.

(30) Foreign Application Priority Data

Mar. 28, 2018 (JP) ................. 2018-062805

(51) Int. Cl.
*E02F 9/20* (2006.01)
*E02F 9/16* (2006.01)
(Continued)

(52) U.S. Cl.
CPC ............ *E02F 9/2004* (2013.01); *E02F 9/166* (2013.01); *A47C 7/54* (2013.01); *B60N 2/75* (2018.02);
(Continued)

(58) Field of Classification Search
CPC ....... E02F 9/2004; E02F 9/166; E02F 9/2066; E02F 9/16; G05G 1/01; A47C 7/54; B60N 2/75
(Continued)

(56) References Cited

U.S. PATENT DOCUMENTS 6,039,141 A * 3/2000 Denny ................... B60N 2/797
296/190.01
6,450,284 B1 * 9/2002 Sakyo ....................... E02F 9/26
340/684
(Continued)

FOREIGN PATENT DOCUMENTS

DE 112014002417 T5 * 2/2016 .............. E02F 3/845
JP H10-327483 12/1998
(Continued)

OTHER PUBLICATIONS

International Search Report for PCT/JP2019/013442 mailed on Jun. 18, 2019.

*Primary Examiner* — Amy R Weisberg
*Assistant Examiner* — Dana D Ivey
(74) *Attorney, Agent, or Firm* — IPUSA, PLLC

(57) ABSTRACT

A construction machine includes a cabin, an operator seat provided in the cabin, a seat right side console provided on the right side of an operator to be seated in the operator seat, and extending along a front-to-back direction of the operator seat, a right operating lever provided at the front of the seat right side console, a switch panel provided on the seat right side console, and a right armrest extending from the back side toward the front of the operator seat, and placed above the seat right side console. The switch panel is placed between the right armrest and the right operating lever.

18 Claims, 8 Drawing Sheets

(51) Int. Cl.
  *A47C 7/54* (2006.01)
  *B60N 2/75* (2018.01)
  *G05G 1/01* (2008.04)
(52) U.S. Cl.
  CPC .............. *E02F 9/16* (2013.01); *E02F 9/2066* (2013.01); *G05G 1/01* (2013.01)
(58) Field of Classification Search
  USPC ..................................................... 296/190.01
  See application file for complete search history.

(56) References Cited

U.S. PATENT DOCUMENTS

| | | | | |
|---|---|---|---|---|
| 7,757,806 | B2* | 7/2010 | Bower | B60N 2/06 |
| | | | | 180/326 |
| 7,950,492 | B2* | 5/2011 | Jorgensen | B60S 1/0896 |
| | | | | 297/344.21 |
| 8,147,080 | B2* | 4/2012 | Foreman | H01H 9/0228 |
| | | | | 362/85 |
| 8,167,080 | B2* | 5/2012 | Ruhter | E02F 9/16 |
| | | | | 180/334 |
| 9,156,471 | B2* | 10/2015 | Mayer | E05B 77/26 |
| 9,217,240 | B2 | 12/2015 | Shibata | |
| 9,483,133 | B2* | 11/2016 | Gondo | B62J 6/16 |
| 10,372,126 | B2* | 8/2019 | Foster | G05D 1/0212 |
| 2006/0042857 | A1* | 3/2006 | Catton | B60N 2/767 |
| | | | | 180/334 |
| 2017/0225930 | A1* | 8/2017 | Rekow | H01H 21/22 |

FOREIGN PATENT DOCUMENTS

| | | |
|---|---|---|
| JP | 2000-303499 | 10/2000 |
| JP | 2001-065000 | 3/2001 |
| JP | 2001-262626 | 9/2001 |
| JP | 2004-156334 | 6/2004 |
| JP | 2005-141999 | 6/2005 |
| JP | 2005-299132 | 10/2005 |
| JP | 2007-040623 | 2/2007 |
| JP | 2008-069696 | 3/2008 |
| JP | 2009-270270 | 11/2009 |
| JP | 2011-016530 | 1/2011 |
| JP | 2011-116253 | 6/2011 |
| JP | 2011-157751 | 8/2011 |
| JP | 2011-157972 | 8/2011 |
| JP | 2013-007199 | 1/2013 |
| JP | 2013-041797 | 2/2013 |
| JP | 2013-245508 | 12/2013 |
| JP | 2016-037704 | 3/2016 |
| JP | 2017-210729 | 11/2017 |
| KR | 20110071684 | 6/2011 |

* cited by examiner

CONSTRUCTION MACHINE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/013442, filed on Mar. 27, 2019 and designating the U.S., which claims priority to Japanese patent application No. 2018-062805, filed on Mar. 28, 2018. The entire contents of the foregoing applications are incorporated herein by reference.

BACKGROUND

Technical Field

The present disclosure relates to construction machines.

Description of Related Art

Construction machines such as shovels have been provided with a switch panel including various kinds of switches on a display device on the front side in a cabin.

SUMMARY

According to an aspect of an embodiment of the present invention, a construction machine includes a cabin, an operator seat provided in the cabin, a seat right side console provided on the right side of an operator to be seated in the operator seat, and extending along a front-to-back direction of the operator seat, a right operating lever provided at the front of the seat right side console, a switch panel provided on the seat right side console, and a right armrest extending from the back side toward the front of the operator seat, and placed above the seat right side console. The switch panel is placed between the right armrest and the right operating lever.

DETAILED DESCRIPTION

Figure 1:
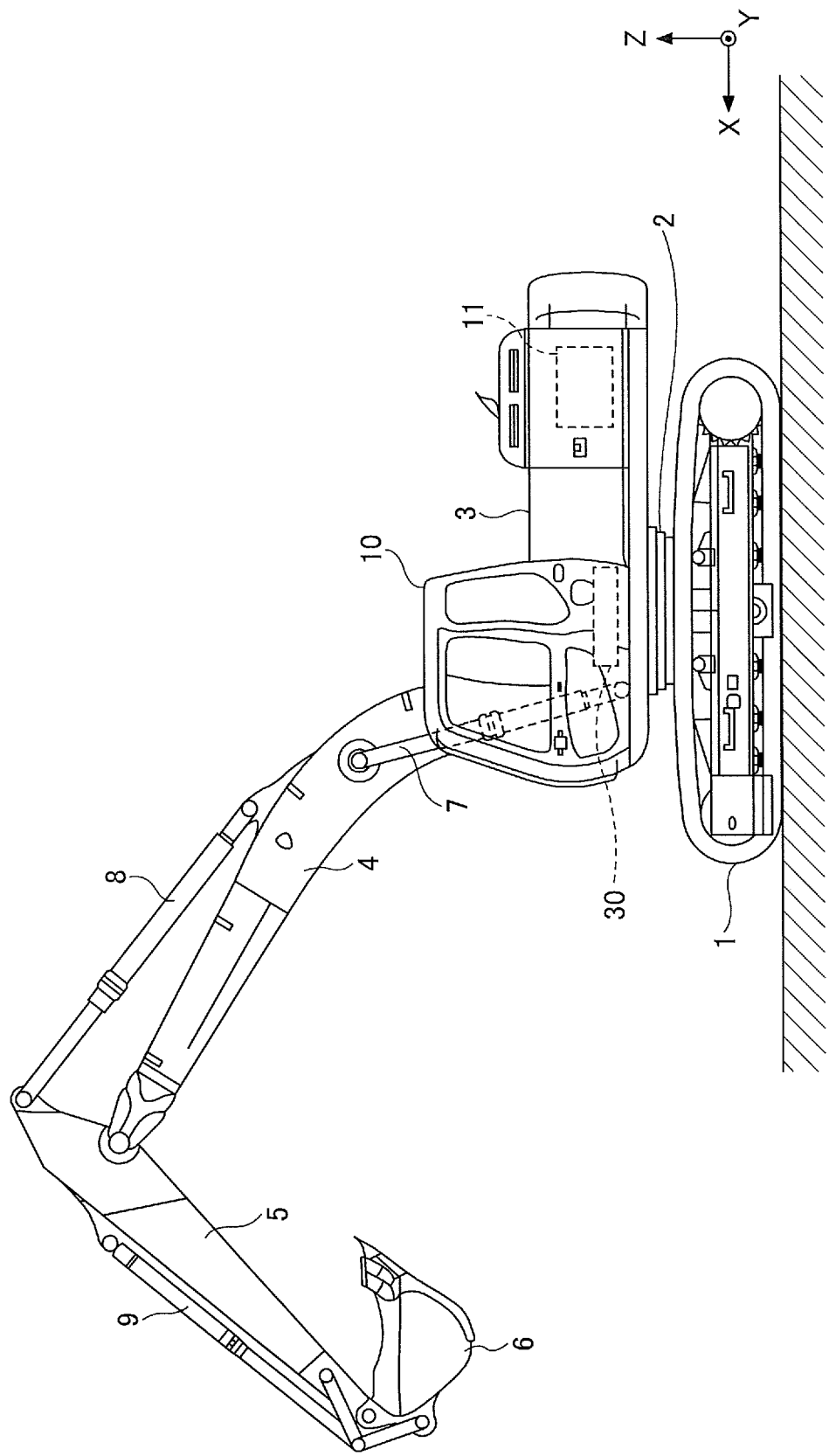
FIG. 1 is a side view of a shovel according to an embodiment of the present invention.

When the switch panel is on the display device, an operator has to reach for the display device to operate switches. Therefore, the operator has to bend forward or remove her/his arm from an armrest every time the operator operates switches. Thus, the operability of switches is extremely poor.

According to an aspect of the present disclosure, it is possible to provide a construction machine with improved operability of switches or the like.

An embodiment is described below with reference to the accompanying drawings. For easier understanding of the description, the same constituent elements are referred to using the same reference numeral as much as possible in the drawings, and duplicate description thereof is omitted.

In the following description, the X direction, the Y direction, and the Z direction are directions perpendicular to one another, and typically, the X direction and the Y direction are horizontal directions and the Z direction is a vertical direction. The X direction is a front-to-back direction of the shovel. The X direction is positive on the front side and negative on the back side. The Y direction is a left-to-right widthwise direction of the shovel. The Y direction is positive on the left side and negative on the right side. The Z direction is the height direction of the shovel. The Z direction is positive on the upper side and negative on the lower side.

First, the overall configuration of a shovel according to an embodiment of the present invention is described with reference to FIG. 1. FIG. 1 is a side view of a shovel (excavator) according to an embodiment of the present invention.

As illustrated in FIG. 1, an upper turning body 3 is turnably mounted on a lower traveling body 1 of the shovel via a turning mechanism 2. A boom 4 is attached to the upper turning body 3. An arm 5 is attached to the distal end of the boom 4. A bucket 6 serving as an end attachment is attached to the distal end of the arm 5. The boom 4, the arm 5, and the bucket 6 constitute an excavation attachment as an example of an attachment, and are hydraulically driven by a boom cylinder 7, an arm cylinder 8, and a bucket cylinder 9. A cabin 10 serving as a cab is provided and a power source such as an engine 11 is mounted on the upper turning body 3.

A controller 30 is installed in the cabin 10. The controller 30 operates as a main control part to control the driving of the shovel. According to this embodiment, the controller 30 is constituted of a computer including a CPU, a RAM, and a ROM. Various functions of the controller 30 are implemented by the CPU executing programs stored in the ROM, for example.

Figure 2:
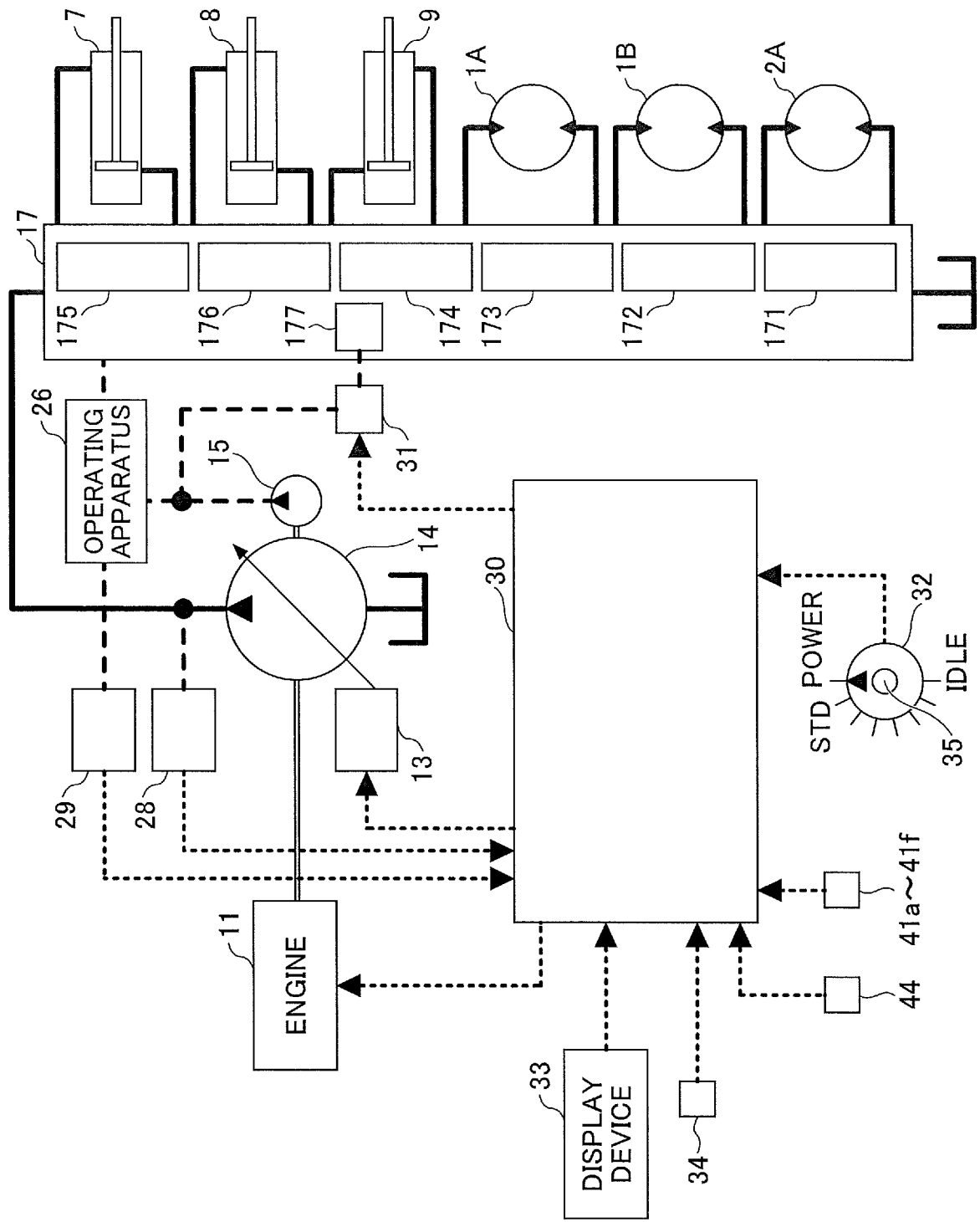
FIG. 2 is a block diagram illustrating an example configuration of a drive system of the shovel of FIG. 1.

Next, a configuration of the drive system of the shovel of FIG. 1 is described with reference to FIG. 2. FIG. 2 is a block diagram illustrating an example configuration of the drive system of the shovel of FIG. 1. In FIG. 2, a mechanical power system, a high-pressure hydraulic line, a pilot line, and an electric control system are indicated by a double line, a thick solid line, a dashed line, and a dotted line, respectively.

As illustrated in FIG. 2, the drive system of the shovel mainly includes the engine 11, a regulator 13, a main pump 14, a pilot pump 15, a control valve 17, an operating apparatus 26, a discharge pressure sensor 28, an operating pressure sensor 29, the controller 30, a proportional valve 31, a dial 32, a display device 33, and a group of switches 41a through 41f.

The engine 11 is a drive source of the shovel. According to this embodiment, the engine 11 is, for example, a diesel engine that operates to maintain a predetermined rotational speed. The output shaft of the engine 11 is connected to the input shafts of the main pump 14 and the pilot pump 15.

The main pump 14 supplies hydraulic oil to the control valve 17 via a high-pressure hydraulic line. According to this embodiment, the main pump 14 is a swash plate variable displacement hydraulic pump.

The regulator 13 controls the discharge quantity of the main pump 14. According to this embodiment, the regulator 13 controls the discharge quantity of the main pump 14 by adjusting the swash plate tilt angle of the main pump 14 in response to a control command from the controller 30.

The pilot pump 15 supplies hydraulic oil to various hydraulic control apparatuses including the operating apparatus 26 and the proportional valve 31 via a pilot line. According to this embodiment, the pilot pump 15 is a fixed displacement hydraulic pump.

The control valve 17 is a hydraulic control device that controls a hydraulic system in the shovel. According to this embodiment, the control valve 17 includes control valves 171 through 176 and a bleed valve 177. The control valve 17 can selectively supply hydraulic oil discharged by the main pump 14 to one or more hydraulic actuators through the control valves 171 through 176. The control valves 171 through 176 control the flow rate of hydraulic oil flowing from the main pump 14 to hydraulic actuators and the flow rate of hydraulic oil flowing from hydraulic actuators to a hydraulic oil tank. The hydraulic actuators include the boom cylinder 7, the arm cylinder 8, the bucket cylinder 9, a left side traveling hydraulic motor 1A, a right side traveling hydraulic motor 1B, and a turning hydraulic motor 2A. The bleed valve 177 controls the flow rate of a portion of hydraulic oil discharged by the main pump 14 which portion flows to the hydraulic oil tank through no hydraulic actuators (hereinafter, "bleed flow rate"). The bleed valve 177 may be installed outside the control valve 17.

The operating apparatus 26 is an apparatus that an operator uses to operate hydraulic actuators. According to this embodiment, the operating apparatus 26 supplies hydraulic oil discharged by the pilot pump 15 to the pilot ports of control valves corresponding to hydraulic actuators through a pilot line. The pressure of hydraulic oil supplied to each pilot port (pilot pressure) is a pressure commensurate with the direction of operation and the amount of operation of a lever or pedal (see FIGS. 3 and 4) of the operating apparatus 26 for a corresponding hydraulic actuator.

The discharge pressure sensor 28 detects the discharge pressure of the main pump 14. According to this embodiment, the discharge pressure sensor 28 outputs the detected value to the controller 30.

The operating pressure sensor 29 detects the details of the operator's operation using the operating apparatus 26. According to this embodiment, the operating pressure sensor 29 detects the direction of operation and the amount of operation of a lever or pedal of the operating apparatus 26 for a corresponding hydraulic actuator in the form of pressure (operating pressure), and outputs the detected value to the controller 30. The details of the operation of the operating apparatus 26 may be detected using a sensor other than an operating pressure sensor.

The proportional valve 31 operates in response to a control command output by the controller 30. According to this embodiment, the proportional valve 31 is a solenoid valve that adjusts a secondary pressure introduced from the pilot pump 15 to the pilot port of the bleed valve 177 in the control valve 17, in response to an electric current command output by the controller 30. For example, the proportional valve 31 operates such that the secondary pressure introduced to the pilot port of the bleed valve 177 increases as the electric current command increases.

The dial 32 is a rotary knob for the operator selecting the rotational speed of the engine 11. The dial 32 can rotate to adjust the engine rotational speed. Furthermore, the dial 32 is provided with an output characteristic change switch 35. The output characteristic of the shovel can be changed by depressing the output characteristic change switch 35.

The dial 32 allows the engine rotational speed to be selected from multiple levels. These multiple levels include, for example, POWER mode, STD mode, and IDLE mode as illustrated in FIG. 2. The POWER mode is a work mode selected when it is desired to prioritize workload, and uses the highest engine rotational speed and uses the highest acceleration/deceleration characteristic. The STD mode is a work mode selected when it is desired to satisfy both workload and fuel efficiency, and uses the second highest engine rotational speed and the second highest acceleration/deceleration characteristic. The IDLE mode is a work mode selected when it is desired to idle the engine 11, and uses the lowest engine rotational speed and the lowest acceleration/deceleration characteristic.

Furthermore, the output characteristic can be switched between the two levels of a normal characteristic and a low fuel consumption characteristic, using the output characteristic change switch 35, for example. The low fuel consumption characteristic is an output characteristic selected when it is desired to moderate the acceleration characteristic or deceleration characteristic of a hydraulic actuator responsive to a lever operation to improve operational accuracy and safety and operate the shovel with low noise. For example, for the low fuel consumption characteristic, the engine output torque diagram is changed. Specifically, an engine output torque diagram of the low fuel consumption characteristic is prepared in addition to an engine output torque diagram of the normal characteristic, and the output characteristic change switch 35 is pressed to change the engine output torque diagram. That is, when the output characteristic is set to the low fuel consumption characteristic, the engine output torque diagram is changed to that of smaller torque. Furthermore, for example, for the low fuel consumption characteristic, the engine rotational speed may be reduced by a predetermined value on the same engine output torque diagram (the engine output torque diagram of the normal characteristic). Specifically, the engine rotational speed is reduced by a predetermined value at each level of the dial 32. At this point, the maximum engine rotational speed of the low fuel consumption characteristic may be lower than the maximum engine rotational speed of the normal characteristic. Thus, the low fuel consumption characteristic makes it possible to operate the shovel with lower fuel consumption than the normal characteristic by controlling the engine 11. Here, for the low fuel consumption characteristic, the engine rotational speed may be reduced by a predetermined value in addition to changing the engine output torque diagram of the normal characteristic to another engine output torque diagram.

The dial 32 and the output characteristic change switch 35 constantly transmit information on the setting of the engine rotational speed and the output characteristic to the controller 30. The controller 30 controls the rotational speed of the engine 11 at the engine rotational speed set with the dial 32.

Furthermore, various kinds of information are input to the controller 30 from a display device side switch group 34, the group of switches 41a through 41f, and rocker switches 44.

Figure 3:
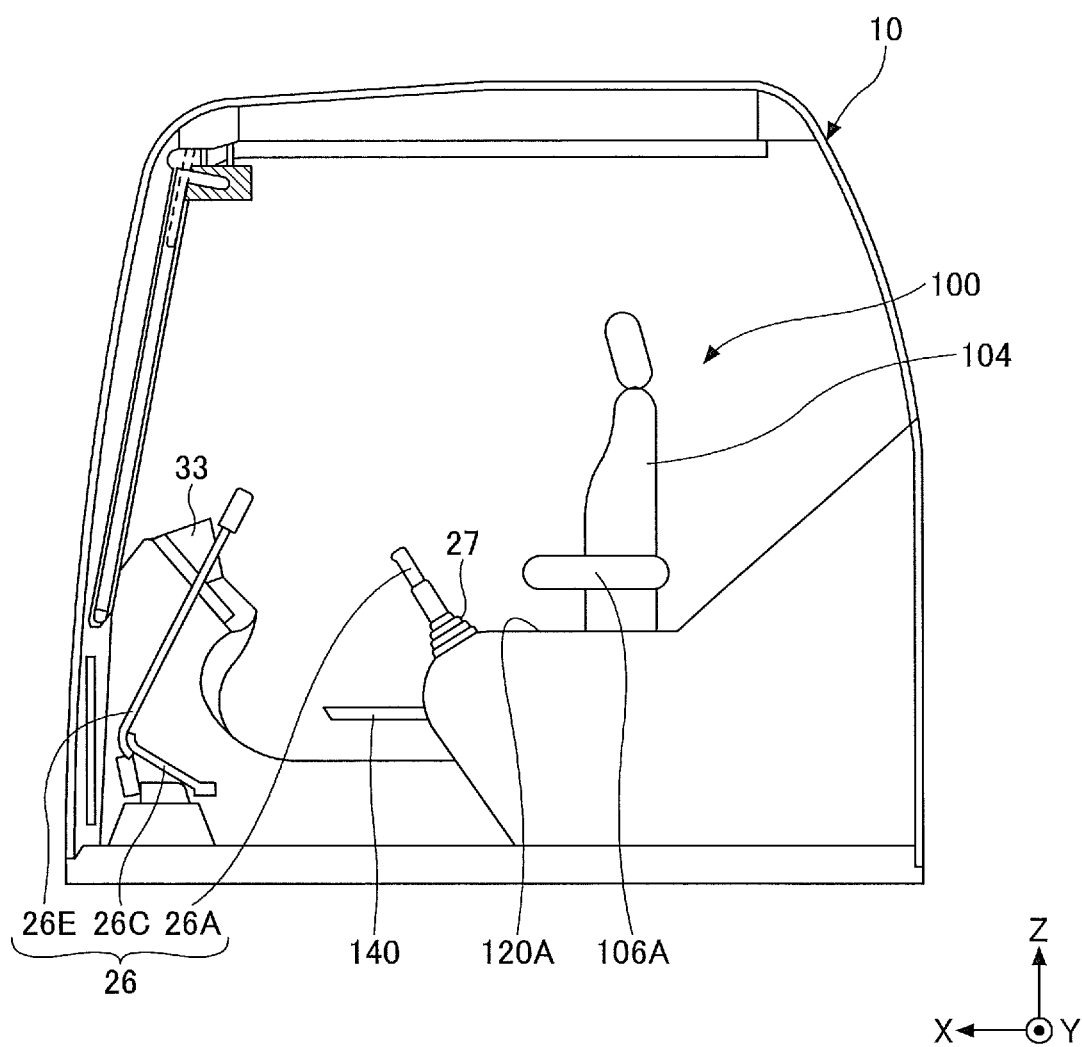
FIG. 3 is a left side view of an inside of a cabin as view from the positive side of a Y direction.
Figure 4:
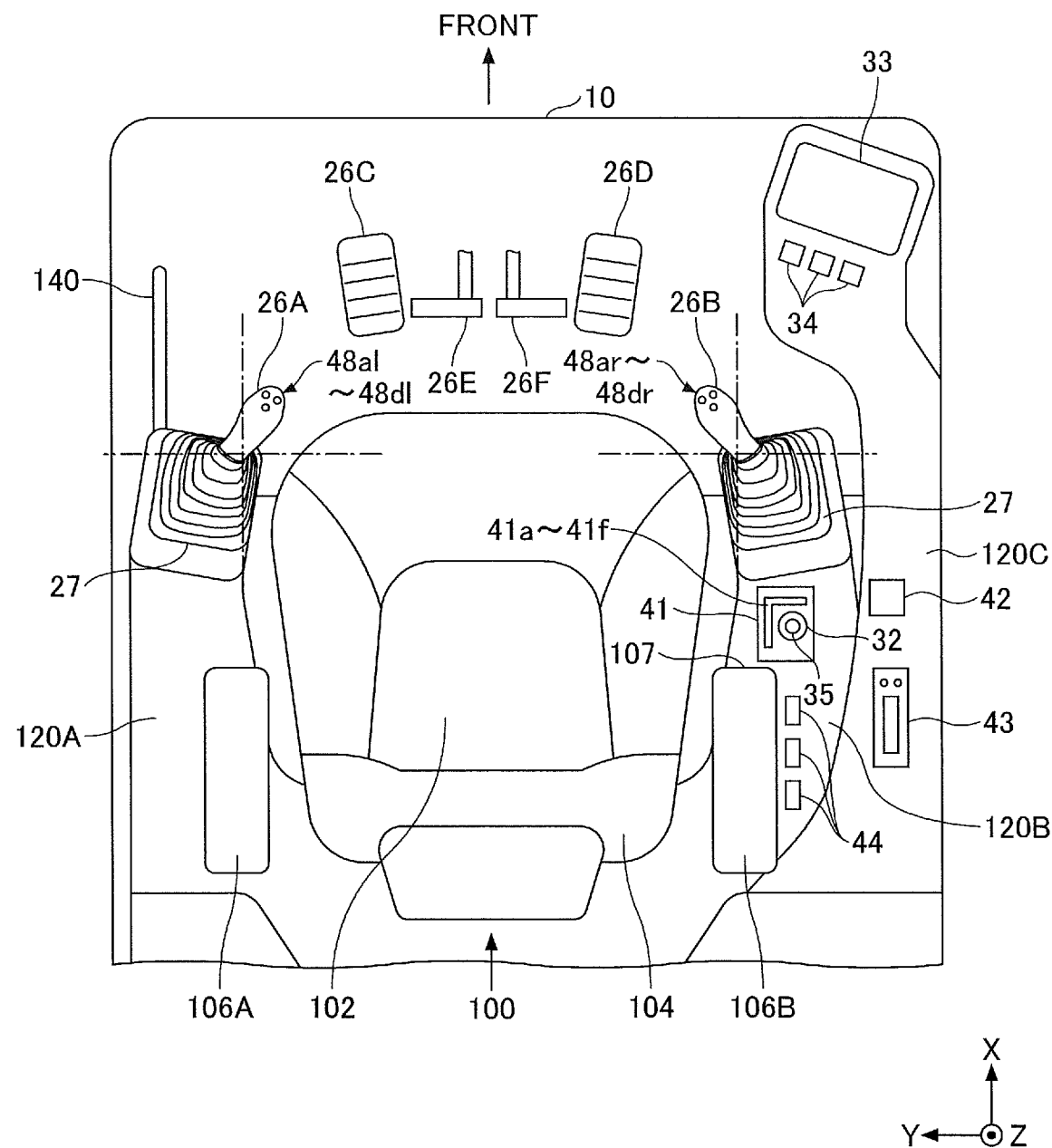
FIG. 4 is a plan view of the inside of the cabin as viewed from the positive side of a Z direction.

Next, an operator seat 100 and the operating apparatus 26 installed in the cabin 10 are described with reference to FIGS. 3 and 4. FIG. 3 is a left side view of the inside of the cabin 10 as viewed from the positive side of the Y direction. FIG. 4 is a plan view of the inside of the cabin 10 as viewed from the positive side of the Z direction.

The operator seat 100 is installed in the cabin 10. The operator seat 100 includes a seat 102 in which the operator sits and a back 104. The operator seat is a recliner and the inclination angle of the back 104 is adjustable. A left armrest 106A and a right armrest 106B are disposed on the left side and the right side, respectively, of the operator seat 100. The left armrest 106A and the right armrest 106B are rotatably supported.

A seat left side console 120A and a seat right side console 120B are disposed on the left side and the right side, respectively, of the operator seat 100. The seat left side console 120A and the seat right side console 120B are so provided as to extend along the front-to-back direction of the operator seat 100. The operator seat 100 is configured to be slidable forward and backward. Accordingly, the operator can move and fix the operator seat 100 to a desired position relative to a left travel lever 26E, a right travel lever 26F, the windshield of the cabin 10, the seat left side console 120A, and the seat right side console 120B. Here, the operator seat 100 may be configured to be movable forward and backward together with the seat left side console 120A, the seat right side console 120B, the left armrest 106A, and the right armrest 106B.

A left operating lever 26A is provided at the front of the seat left side console 120A. Likewise, a right operating lever 26B is provided at the front of the seat right side console 120B. The operator seated in the operator seat 100 operates the left operating lever 26A while holding the left operating lever 26A with the left hand, and operates the right operating lever 26B while holding the right operating lever 26B with the right hand. The operator seated in the operator seat 100 operates the left operating lever 26A with the left hand to drive the arm cylinder 8 and the turning hydraulic motor 2A. Furthermore, the operator seated in the operator seat 100 operates the right operating lever 26B with the right hand to drive the boom cylinder 7 and the bucket cylinder 9.

The left operating lever 26A and the right operating lever 26B are covered with respective lever covers 27 on their base side. As a result, the left operating lever 26A and the right operating lever 26B are steplessly and continuously connected to the surfaces of the seat left side console 120A and the seat right side console 120B, respectively.

A left travel pedal 26C and a right travel pedal 26D are disposed on a floor in front of the operator seat 100. The operator seated in the operator seat 100 operates the left travel pedal 26C with the left foot to drive the left side traveling hydraulic motor 1A. Furthermore, the operator seated in the operator seat 100 operates the right travel pedal 26D with the right foot to drive the right side traveling hydraulic motor 1B.

The left travel lever 26E extends upward from the vicinity of the left travel pedal 26C. The operator seated in the operator seat 100 can drive the left side traveling hydraulic motor 1A by operating the left travel lever 26E while holding the left travel lever 26E with the left hand, the same as in the operation with the left travel pedal 26C. Furthermore, the right travel lever 26F extends upward from the vicinity of the right travel pedal 26D. The operator seated in the operator seat 100 can drive the right side traveling hydraulic motor 1B by operating the right travel lever 26F while holding the right travel lever 26F with the right hand, the same as in the operation with the right travel pedal 26D.

The display device 33 that displays information such as the work conditions and the operating condition of the shovel is placed at the front right in the cabin 10. The operator seated in the operator seat 100 can perform work with the shovel while checking various kinds of information displayed on the display device 33. The display device 33 is provided with, for example, the display device side switch group 34 for display control of the display device 33.

Furthermore, a gate lock lever 140 is provided on the left side of the operator seat 100 (namely, on the entrance/exit door side of the cabin 10). Pulling up the gate lock lever 140 allows the engine 11 to start, thus making it possible to operate the shovel. Pulling down the gate lock lever 140 disables an operating part including the engine 11 from starting. Accordingly, unless the operator sits in the operator seat 100 and pulls up the gate lock lever 140, the shovel cannot operate and the safety is maintained.

A window side console 120C is installed to the right of the seat right side console 120B on the right side of the operator seat 100. The window side console 120C, for example, extends along the front-to-back direction of the cabin 10 and is provided parallel to the seat right side console 120B. The display device 33 may be installed at the front of the window side console 120C. An ignition switch 42, a radio 43, etc., are installed on the window side console 120C. Here, the ignition switch 42, the radio 43, etc., may be installed on the seat left side console 120A or the seat right side console 120B.

The left armrest 106A and the right armrest 106B are placed above the seat left side console 120A and the seat right side console 120B, respectively. The left armrest 106A and the right armrest 106B are placed such that at least part of the left armrest 106A and at least part of the right armrest 106B conceal a back portion of the seat left side console 120A and a back portion of the seat right side console 120B, respectively, when viewed in the Z direction.

In particular, according to this embodiment, a switch panel 41 is placed between the right armrest 106B and the right operating lever 26B on the seat right side console 120B. The switch panel 41 includes the group of switches 41a through 41f and the dial 32. The output characteristic change switch 35 is provided on the dial 32.

Figure 5:
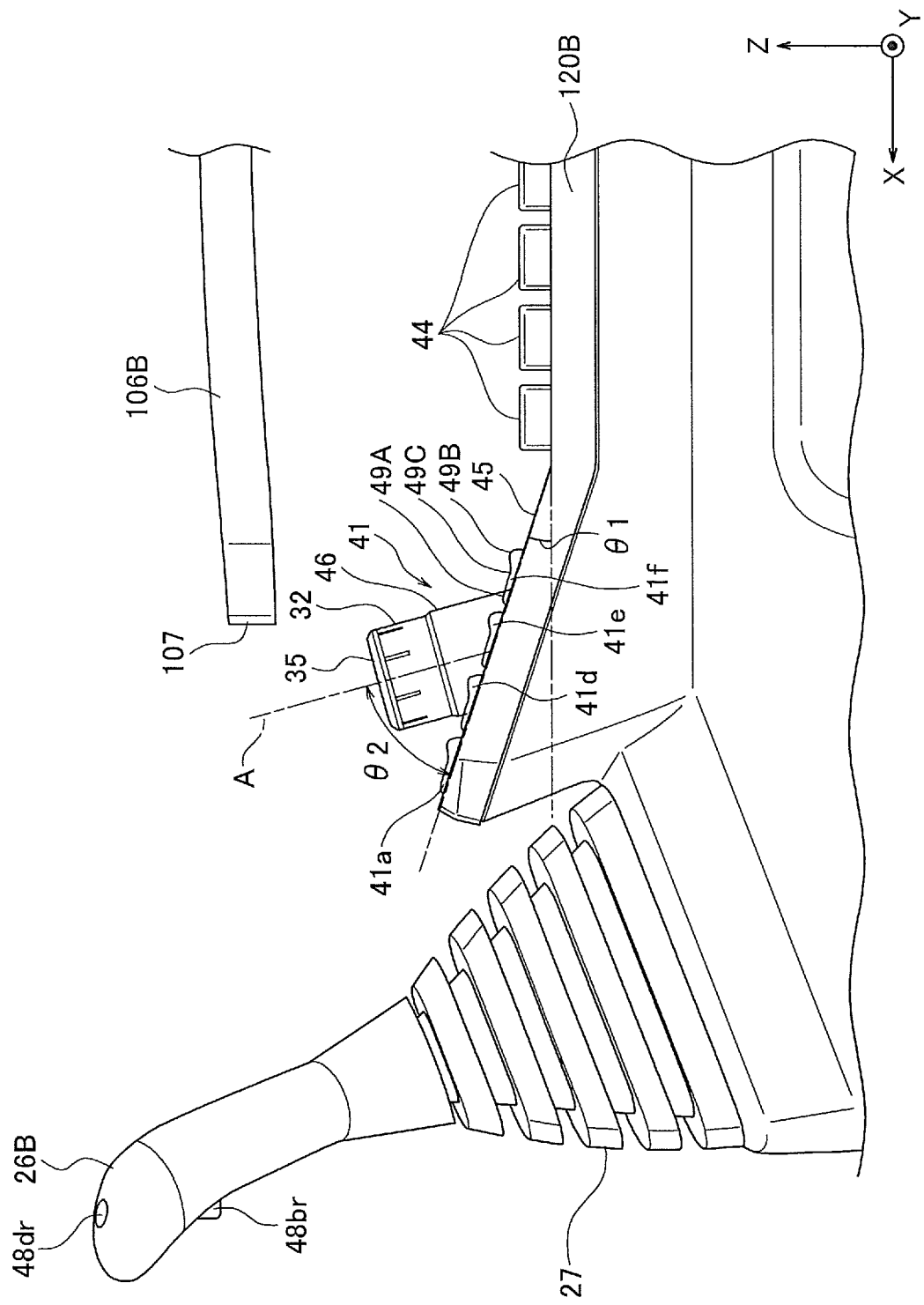
FIG. 5 is a side view of a switch panel and its vicinity.
Figure 6:
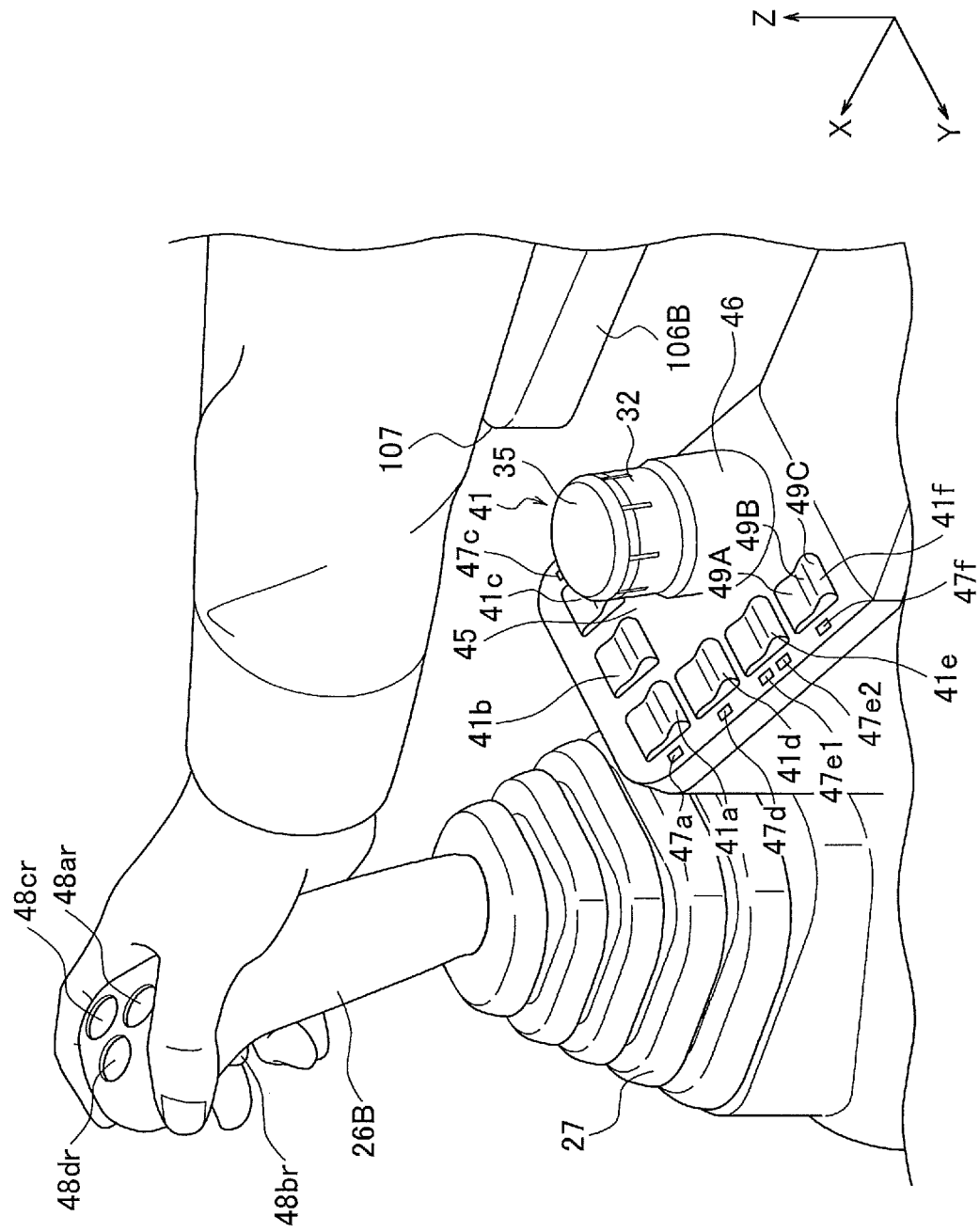
FIG. 6 is a perspective view of the switch panel and its vicinity.

The switch panel 41 is described in detail with reference to FIGS. 5 and 6. FIG. 5 is a side view of the switch panel 41 and its vicinity. FIG. 6 is a perspective view of the switch panel 41 and its vicinity.

The switch panel 41 is provided on the upper surface of the seat right side console 120B and is placed in front of the right armrest 106B and behind the right operating lever 26B.

The right armrest 106B can move forward and backward together with the operator seat 100. The armrest length is preferably determined such that a front end portion 107 of the right armrest 106B does not cover the entirety of the switch panel 41 from above even when the right armrest 106B is at a forward end position. Here, the left armrest 106A and the right armrest 106B may be configured to be movable forward and backward independent of the movement of the operator seat 100. Furthermore, the right armrest 106B may cover part of the switch panel 41 from above as long as the right armrest 106B does not cover at least the group of switches 41a through 41f and the dial 32 from above.

Functions that are more frequently used during the operation of the shovel are preferably applied to the group of switches 41a through 41f provided in the switch panel 41. For example, the group of switches 41a through 41f may include a switch having the function of travel switching as a setting change switch, a switch having the function of selecting a backup circuit (selecting an attachment), and switches having the function of switching on and off equipment items such as a windshield wiper, a light, and windshield washer fluid.

By thus placing the switch panel 41, the group of switches 41a through 41f more frequently used during the operation of the shovel can be gathered on the seat right side console 120B. The operator who holds the right operating lever 26B with her/his arm resting on the right armrest 106B can operate the switch panel 41 with her/his arm remaining on the right armrest 106B by releasing a hold on the right operating lever 26B. This enables the operator to operate switches without bending forward or removing her/his arm from an armrest when operating switches, thus improving the operability of switches or the like.

The switch panel 41 is placed with an upper surface 45 being inclined toward the right armrest 106B behind. An inclination angle θ1 of the upper surface 45 is, for example, approximately 10 degrees to approximately 40 degrees. This makes it easier for the operator to see the upper surface 45 of the switch panel 41, so that the operability can be further improved. Here, the upper surface 45 of the switch panel 41 may be further inclined toward the operator seat 100 (to the positive side of the Y direction).

The dial 32 has a substantially cylindrical shape whose central axis is an axis of rotation A. The dial 32 can rotate about the axis of rotation A, and rotates about the axis of rotation A to adjust the rotational speed of the engine 11. Furthermore, the output characteristic change switch 35 is provided on the upper surface of the cylindrical shape of the dial 32, and is depressed in the direction of the axis of rotation A to switch the output characteristic of the shovel.

The dial 32 is placed with the direction of the axis of rotation A being inclined toward the right operating lever 26B in front relative to a horizontal plane. Specifically, a base 46 is provided on the upper surface 45 of the switch panel 41 inclined toward the back. The base 46 is formed such that its upper surface is inclined toward the front, and the dial 32 is provided on the upper surface of the base 46. The forward inclination of the axis of rotation A of the dial 32 makes it easier for the operator to hold the dial 32 with her/his arm remaining on the right armrest 106B, so that the operability of the dial 32 can be improved.

An inclination angle θ2 of the axis of rotation A of the dial 32 to the upper surface 45 of the switch panel 41 is, for example, approximately 20 degrees to approximately 50 degrees.

As described above, switches having functions more frequently used during operation are preferably applied to the group of switches 41a through 41f of the switch panel 41. In contrast, switches having functions less frequently used during operation may be applied to the display device side switch group 34 placed on the display device 33. The display device side switch group 34 may include, for example, the temperature control and the air volume control of an air conditioner, the switching of an hour meter and a trip meter, and up, down, left and right keys.

Optional functions may be suitably applied to the rocker switches 44. The rocker switches 44 may include, for example, selecting a backup circuit (selecting an attachment) used by an applied machine (such as a grapple or a lifting magnet), a travel alarm, and the turning on and off of an obstacle detecting function. Here, the rocker switches 44 are placed below the right armrest 106B on the seat right side console 120B.

The control method of the switch panel 41 may be, for example, providing the switch panel 41 with a microcomputer to control the information of the group of switches 41a through 41f and the dial 32 and transmitting the information to the controller 30 through CAN communications, or transmitting the signals of the various switches 41a through 41f and the dial 32 to the controller 30 and controlling the signals with the controller 30.

The group of switches 41a through 41f of the switch panel 41 is placed in an area surrounding the dial 32, and accordingly to this embodiment, are placed on the operator seat 100 side and the right operating lever 26B side of the dial 32. The group of switches 41a through 41f are assigned as follows. For example, the switch 41a on the upper left of the switch panel 41 is for switching travel speed, the switch 41b on its right side (on its negative Y direction side) is for selecting a backup circuit, the switch 41c on its right side is for selecting a crane mode, the switch 41d on the near side (the negative X direction side) of the switch 41a is a work light switch, the switch 41e on its near side is a windshield wiper switch, and the switch 41f on its near side is a windshield washer fluid switch.

At least one or more of the group of switches 41a through 41f (the switches 41a, 41d, 41e and 41f according to the example of FIG. 6) are preferably placed on the operator seat 100 side of the dial 32. As a result, as illustrated in FIG. 6, switches are placed on the near side of the operator seated in the operator seat 100. Therefore, it is easier for the operator to see the switches, so that their operability can be improved.

According to this embodiment, the switches 41a through 41f are preferably of a type that alternately turns on and off each time it is pressed and, after being pressed, returns to a reference position before being pressed. This prevents a switching operation from causing the switches 41a through 41f to be depressed relative to the upper surface 45 of the switch panel 41. Therefore, it is possible to cause dust or like to be less likely to accumulate on the switch panel 41.

Furthermore, the surfaces of the switches 41a through 41f are integrated (or formed continuously) with the upper surface 45 of the switch panel 41. As a result, there is no gap between each of the switches 41a through 41f and the upper surface 45. Therefore, it is possible to prevent dust from entering the inside of the switch panel 41 through a gap, so that it is possible to ensure the operational stability of the switch panel 41. The switches 41a through 41f and the upper surface 45 are formed of a material that is pressed to generate elasticity, such as silicon, to be able to improve the feeling of contact of switches. Furthermore, the surfaces of the switches 41a through 41f are subjected to matting to make dust less likely to adhere to the switch surfaces.

Furthermore, as illustrated in FIGS. 5 and 6, each of the switches 41a through 41f is shaped such that a back portion 49B on the vehicle back side (on the negative side of the X direction) protrudes more than a front portion 49A on the vehicle front side (on the positive side of the X direction) relative to the upper surface 45 of the switch panel 41. When viewed from the side (in the Y direction), a smooth concave surface portion 49C is formed from the protruding portion of the back portion 49B to the front portion 49A. When the operator places her/his finger on a switch along the X direction such that the fingertip points forward, the pad of the finger fits in this concave surface portion 49C. As a result, the engagement of a finger with the switches 41a through 41f can be improved, so that the operability of the switches 41a through 41f can be improved.

On the group of switches 41a through 41f of the switch panel 41, such illustrations as to make it possible to understand functions assigned to the switches may be drawn. The illustrations on the switches may emit light when the switches are turned on.

Furthermore, in the vicinity of the switches 41a through 41f on the upper surface 45 of the switch panel 41, indicators 47a through 47f corresponding to the switches are provided. The indicators 47a through 47f switch between a lit state and an unlit state in accordance with a switch operation. For example, each indicator can light up when its associated switch is turned on, to make it easier for the operator to visually recognize that the switch is turned on. For example, when the switch 41d for turning on work lights is turned on, the indicator 47d corresponding to this switch 41d lights up, and when the switch 41d for turning on work lights is turned off, the indicator 47d turns off. The indicators 47a through 47f light up in, for example, orange, but may also light up in other colors (such as blue, red, and yellow). Such visual effects of the indicators 47a through 47f are particularly effective when the switches 41a through 41f are of a type that alternately turns on and off each time it is pressed, and after being pressed, returns to a reference position before being pressed after being pressed, and do not differ in appearance between a lit state and an unlit state. In FIG. 6, the graphical representation of the indicator 47b is omitted. Furthermore, any of the indicators 47a through 47f may be omitted.

The alphabetical letters a through f of the reference numerals of the indicators are equal to those of the reference numerals of the switches 41a through 41f with which the operations of the indicators are associated. The number of indicators associated with each switch may be two or more, and according to the example of FIG. 6, two indicators 47e1 and 47e2 are associated with the switch 41e. As described above, the switch 41e is a windshield wiper switch, and the operating speed of a windshield wiper switches between multiple levels according to the number of times the switch 41e is depressed. For example, when the windshield wiper operates at low speed, only the indicator 47e1 may light up, and when the windshield wiper operates at high speed, both of the indicators 47e1 and 47e2 may light up. Thus, the lighting pattern of an indicator and the number of indicators may be adjusted as desired according to the function of each switch. As a result, the operator can be more effectively notified of the status of implementation of the function of each switch.

Furthermore, according to this embodiment, different functions may be performed according to the way the switches 41a through 41f are pressed. For example, when the switch 41a for switching travel speed and the switch 41d for turning on work lights that are next to each other are simultaneously pressed and held, the turning operation of the shovel is locked. When the switch 41b for selecting a backup circuit is pressed and held, a backup circuit setting screen is displayed on the display device 33.

Furthermore, according to this embodiment, even after the engine 11 of the shovel is stopped, the switches 41a through 41f may be kept ON for a predetermined time. For example, when the engine 11 is stopped while the switch 41d for turning on work lights is turned on to turn on the work lights of the shovel, the switch 41d is kept ON for a predetermined time, so that the work lights can turn on for a predetermined time after the engine 11 stops. In this case, the work lights do not turn off immediately after the engine 11 stops but continue to turn on for a predetermined time. Therefore, it is possible to ensure the visibility of the surroundings for the operator who gets off the cabin 10 for better safety.

Furthermore, according to this embodiment, as illustrated in FIG. 6, a bottom switch 48ar, a right switch 48cr, and a left switch 48dr are provided on the surface of the upper end portion of the right operating lever 26B on the vehicle back side (on the negative side of the Y direction). The bottom switch 48ar is placed lower than the right switch 48cr and the left switch 48dr. The right switch 48cr and the left switch 48dr are arranged side by side at the same height position with the right switch 48cr on the right side and the left switch 48dr on the left side as viewed from the operator seat 100. Furthermore, a trigger switch 48br is provided on the vehicle front side surface on the opposite side from the bottom switch 48ar, the right switch 48cr, and the left switch 48dr.

The bottom switch 48ar, the right switch 48cr, and the left switch 48dr are placed at such positions as to be operable with the thumb of the right hand of the operator holding the right operating lever 26B with the right hand. Furthermore, the trigger switch 48br is placed at such a position as to be operable with the index finger or the middle finger of the right hand of the operator holding the right operating lever 26B with the right hand.

The bottom switch 48ar, the right switch 48cr, the left switch 48dr, and the trigger switch 48br are preferably of a type that alternately turns on and off each time it is pressed and, after being pressed, returns to a reference position before being pressed, the same as the switches 41a through 41f, for example.

Furthermore, the bottom switch 48ar, the right switch 48cr, the left switch 48dr, and the trigger switch 48br are integrated with the surface of the right operating lever 26B, the same as the switches 41a through 41f, for example. As a result, there is no gap between each of the switches 48ar through 48dr and the surface of the right operating lever 26B. Therefore, it is possible to improve the dust resistance of the right operating lever 26B.

Furthermore, the same as the right operating lever 26B, the left operating lever 26A is provided with a bottom switch 48a1, a trigger switch 48b1, a right switch 48c1, and a left switch 48d1 (see FIG. 4). The arrangement of the bottom switch 48a1, the trigger switch 48b1, the right switch 48c1, and the left switch 48d1 is equal to that of the bottom switch 48ar, the trigger switch 48br, the right switch 48cr, and the left switch 48dr of the right operating lever 26B as described with reference to FIG. 6.

The assignment of the group of switches of the operating levers is as follows. For example, with respect to the right operating lever 26B, the bottom switch 48ar is assigned to a one-touch idling function (the function of switching the engine 11 of the shovel to idling), the trigger switch 48br is assigned to a wiping and washing function, the right switch 48cr is assigned to a hands-free call receiving function (the function of receiving a call on a Bluetooth-connected smartphone), and the left switch 48dr is assigned to the function of switching the ON and OFF of an air conditioner. Furthermore, with respect to the left operating lever 26A, the bottom switch 48a1 is assigned to a horn function, the trigger switch 48b1 is assigned to a muting function for the radio 43 or the like, the right switch 48c1 is assigned to the function of switching on and off an obstacle detection alarm sound (an alarm sound for so notifying the operator when an obstacle or a person is detected in an area surrounding the shovel during execution of the obstacle detecting function of the shovel), and the left switch 48d1 is assigned to the function of switching a camera image to display on the display device 33.

The function of switching on and off the obstacle detection alarm sound of the right switch 48c1 may be assigned to the rocker switches 44 or the group of switches 41a through 41f of the switch panel 41.

Thus, the group of switches 48a1 through 48d1 and 48ar through 48dr of the left operating lever 26A and the right operating lever 26B may be assigned functions different from the functions of the group of switches 41*a* through 41*f* of the switch panel 41. The functions of the group of switches 48*a*1 through 48*d*1 and 48*ar* through 48*dr* of the left operating lever 26A and the right operating lever 26B may be changed as desired through operations on the display device 33, for example.

Figure 7:
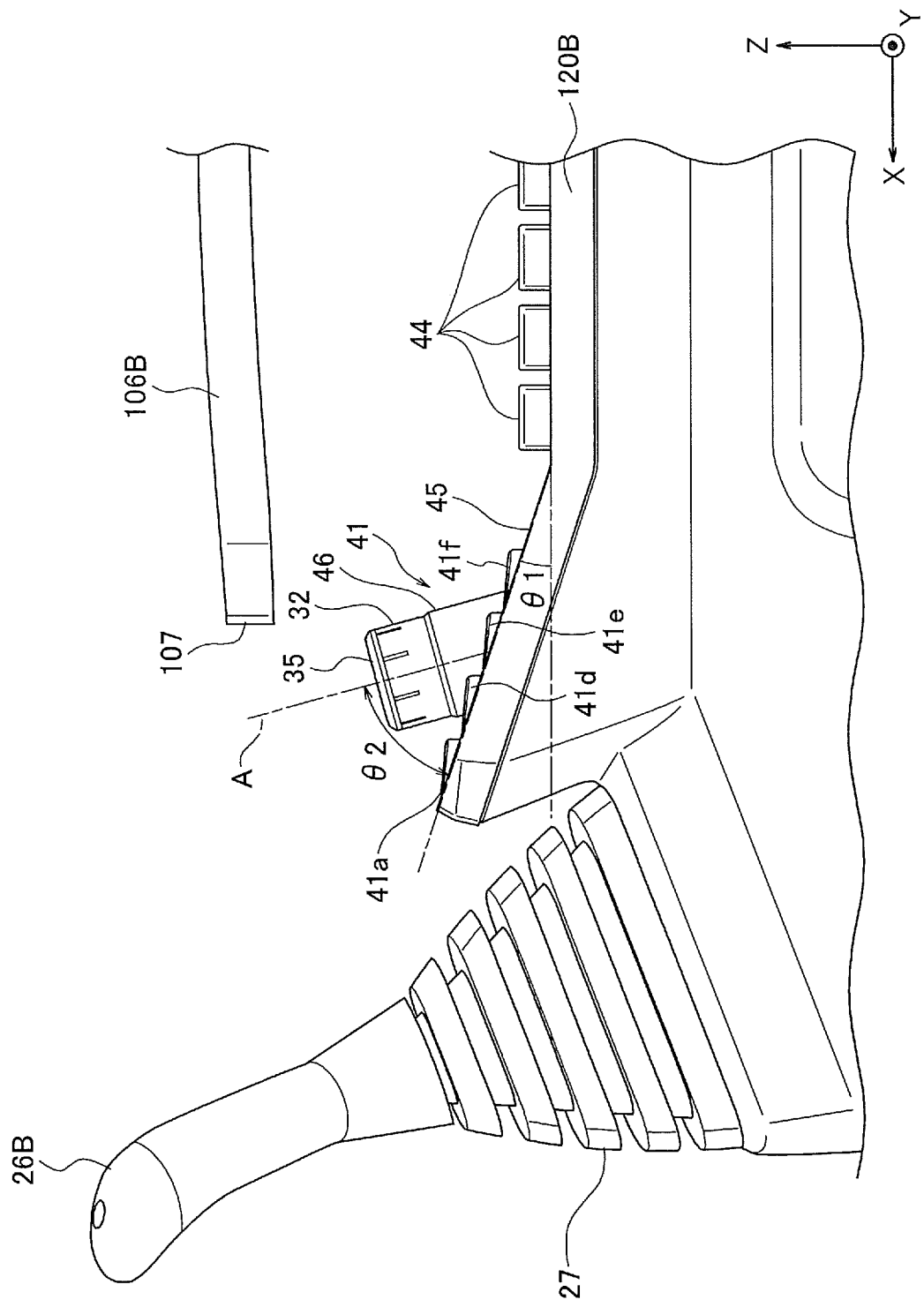
FIG. 7 is a side view of the switch panel of a variation and its vicinity.
Figure 8:
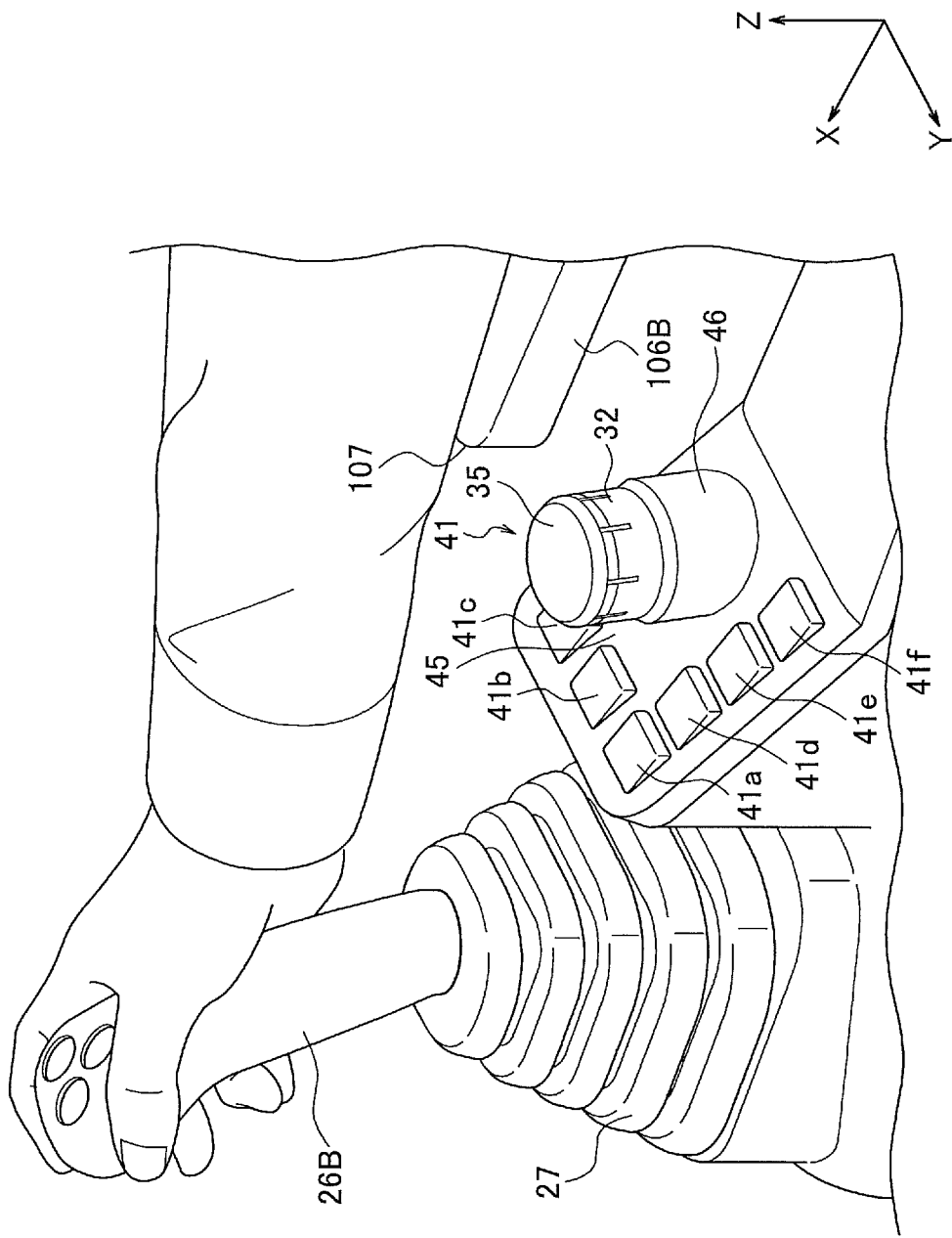
FIG. 8 is a perspective view of the switch panel of the variation and its vicinity.

A variation of a switch shape is described with reference to FIGS. 7 and 8. FIG. 7 is a side view of the switch panel 41 of the variation and its vicinity. FIG. 8 is a perspective view of the switch panel 41 of the variation and its vicinity. The shape of the group of switches 41*a* through 41*f* of the switch panel 41 is not limited to the shape illustrated in FIGS. 5 and 6, and may be a shape having a flat upper surface as illustrated in FIGS. 7 and 8.

An embodiment is described above with reference to specific examples. The present disclosure, however, is not limited to these specific examples. These specific examples may be suitably subjected to design change by a person of ordinary skill in the art within the scope of the present disclosure to the extent that they have the features of the present disclosure. The elements and their arrangement, conditions, shapes, etc., of the above-described specific examples are not limited to those illustrated, and may be suitably changed. The elements of the above-described specific examples may be suitably combined differently to the extent that no technical contradiction is caused.

The switch panel 41 may exclude the dial 32. In this case, the dial 32 may be installed at a different position on the seat right side console 120B or installed on the window side console 120C.

The switch panel 41 may be horizontal the same as the upper surface of the seat right side console 120B, instead of being inclined backward. The dial 32 may be placed parallel to the upper surface of the seat right side console 120B.

The group of switches 41*a* through 41*f*, which has functions different from those of the display device side switch group 34 according to the above-described embodiment, may alternatively have the same functions as those of the display device side switch group 34. Specifically, the display device side switch group 34 may include switches having the function of controlling the temperature and the air volume of an air conditioner, the function of switching an hour meter and a trip meter, the function of up, down, left and right keys, the function of travel switching, the function of a windshield wiper, the function of lights, the function of windshield washer fluid, the function of selecting a backup circuit (selecting an attachment), and the function of selecting a crane mode, and all of switches related to these functions or a switch having at least one of the functions may be included on the upper surface 45 of the switch panel 41.

A shovel is illustrated as an example of a construction machine according to the above-described embodiment, which, however, may also be applied to other construction machines with a lifting magnet, a grapple, a breaker or the like as long as they have the same cabin 10 as the shovel.

What is claimed is:

1. A construction machine comprising:
a cabin;
an operator seat provided in the cabin;
a seat right side console provided on a right side of an operator to be seated in the operator seat, and extending along a front-to-back direction of the operator seat;
a right operating lever provided at a front of the seat right side console;
a cover covering a base of the right operating lever;
a plurality of switches provided on the seat right side console;
a switch panel including a dial provided on the seat right side console, the dial being rotatable about an axis of rotation; and
a right armrest extending from a back side toward a front of the operator seat, and placed above and out of contact with an upper surface of the seat right side console,
wherein the plurality of switches and the dial are placed between the right armrest and the cover of the right operating lever, and
the switch panel has an upper surface inclined toward the right armrest, and the dial is placed such that the axis of rotation is inclined toward the right operating lever relative to the inclined upper surface of the switch panel.

2. The construction machine as claimed in claim 1, wherein
the switch panel further includes the plurality of switches.

3. The construction machine as claimed in claim 1, wherein at least a switch among the plurality of switches is placed between the operator seat and the dial in a left-to-right direction of the cabin.

4. The construction machine as claimed in claim 1, wherein
the right armrest is configured to move forward and backward together with the operator seat, and
a length of the right armrest is determined such that the right armrest at a forward end position is prevented from covering the plurality of switches and the dial from above.

5. The construction machine as claimed in claim 1, wherein
the switch panel further includes the plurality of switches, and
the plurality of switches are integrated with the upper surface of the switch panel.

6. The construction machine as claimed in claim 5, wherein the upper surface of the switch panel and the plurality of switches are integrated gaplessly.

7. The construction machine as claimed in claim 1, wherein
the switch panel further includes the plurality of switches,
a plurality of indicators corresponding to the plurality of switches are provided on the upper surface of the switch panel, and
the plurality of indicators switch between a lit state and an unlit state in response to the corresponding switches being operated.

8. The construction machine as claimed in claim 1, further comprising:
a plurality of other switches provided on the right operating lever,
wherein the plurality of other switches are integrated with a surface of the right operating lever.

9. The construction machine as claimed in claim 1, wherein functions of the plurality of switches change depending on a combination of switches that are simultaneously pressed, or change according to a number of times or a duration of depression of a switch.

10. The construction machine as claimed in claim 1, wherein at least a switch among the plurality of switches is placed between the right operating lever and the dial in a front-to-back direction of the cabin.

11. The construction machine as claimed in claim 1, further comprising:

a display device configured to display information on the construction machine, the display device being placed in front of the operator seat in the cabin; and a window side console installed to a right of the seat right side console in the cabin and extending along the front-to-back direction, wherein the display device is directly connected to a front end of the window side console in the front-to-back direction.

12. The construction machine as claimed in claim 1, wherein the dial is inclined toward the right operating lever.

13. The construction machine as claimed in claim 1, wherein frequently used functions are applied to the plurality of switches.

14. The construction machine as claimed in claim 1, wherein the right armrest is positioned higher than the cover relative to the upper surface of the seat right side console.

15. The construction machine as claimed in claim 1, wherein the right armrest is rotatable in a front-to-back direction of the cabin.

16. The construction machine as claimed in claim 1, further comprising:

a plurality of other switches on the seat right side console below the right armrest.

17. A construction machine comprising:

a cabin;

an operator seat provided in the cabin;

a seat right side console provided on a right side of an operator to be seated in the operator seat, and extending along a front-to-back direction of the operator seat;

a right operating lever provided at a front of the seat right side console;

a plurality of switches provided on the seat right side console;

a dial provided on the seat right side console; and a right armrest extending from a back side toward a front of the operator seat, and placed above the seat right side console, wherein the plurality of switches and the dial are placed between the right armrest and the right operating lever, the dial is rotatable about an axis of rotation, and the dial is placed such that the axis of rotation is inclined toward the right operating lever relative to a horizontal plane.

18. A construction machine comprising:

a cabin;

an operator seat provided in the cabin;

a seat right side console provided on a right side of an operator to be seated in the operator seat, and extending along a front-to-back direction of the operator seat;

a right operating lever provided at a front of the seat right side console;

a plurality of switches provided on the seat right side console;

a dial provided on the seat right side console; and a right armrest extending from a back side toward a front of the operator seat, and placed above the seat right side console, wherein the plurality of switches and the dial are placed between the right armrest and the right operating lever, the dial is rotatable about an axis of rotation, and the dial is configured to rotate to adjust a rotational speed of an engine of the construction machine and configured to be depressed in a direction of the axis of rotation to switch an output characteristic of the construction machine.

* * * * *